Feb. 21, 1950 L. F. CLERC 2,498,028
REFRIGERATOR
Filed Oct. 15, 1945 8 Sheets-Sheet 2

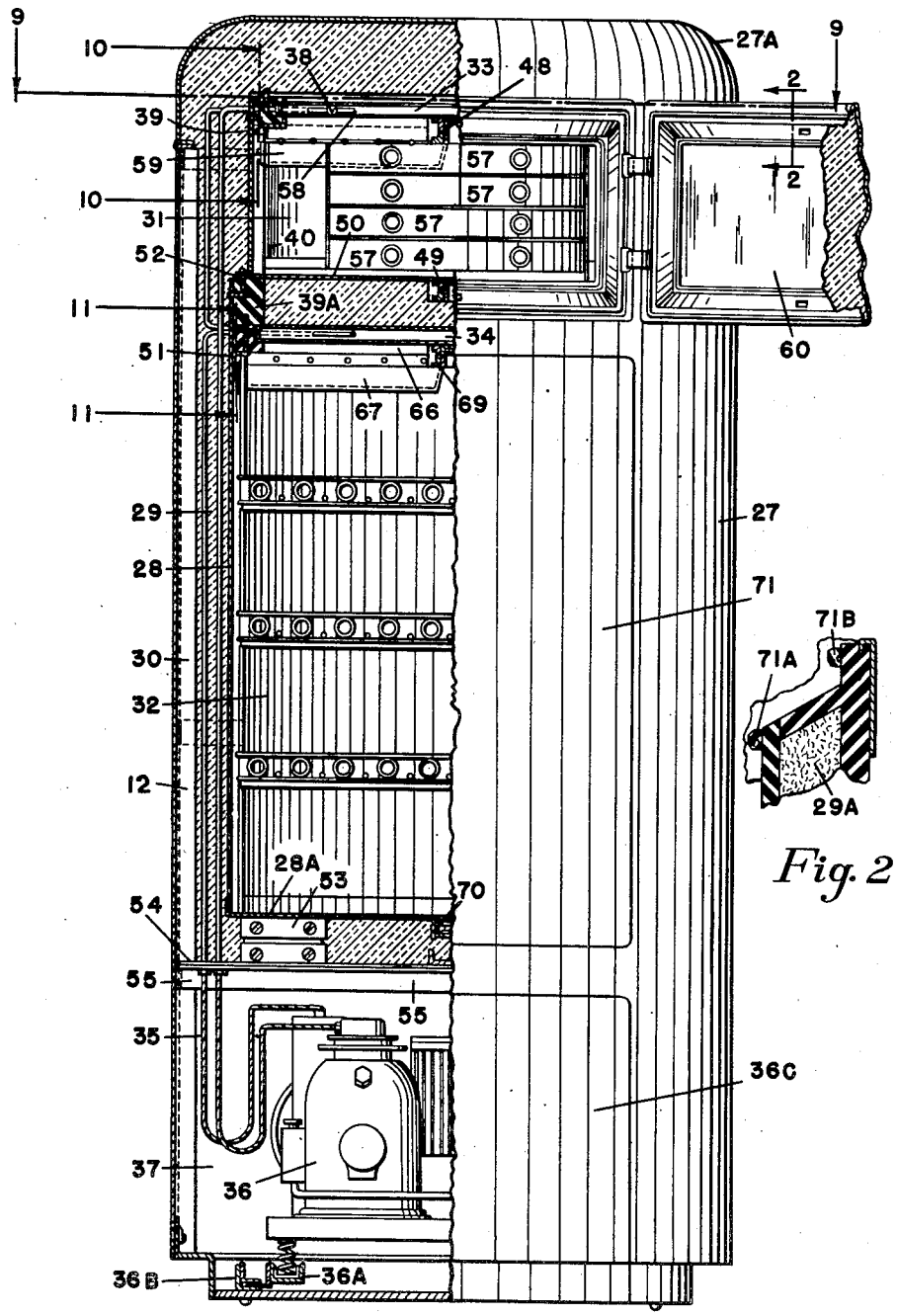

INVENTOR.
LEONARD F. CLERC
BY *Edward M. Apple*
ATTORNEY

Feb. 21, 1950 L. F. CLERC 2,498,028
REFRIGERATOR

Filed Oct. 15, 1945 8 Sheets-Sheet 3

INVENTOR.
LEONARD F. CLERC
BY Edward M. Apple
ATTORNEY

Feb. 21, 1950 L. F. CLERC 2,498,028
REFRIGERATOR
Filed Oct. 15, 1945 8 Sheets-Sheet 4

INVENTOR.
LEONARD F. CLERC
BY Edward M. Apple
ATTORNEY

Feb. 21, 1950 L. F. CLERC 2,498,028
REFRIGERATOR
Filed Oct. 15, 1945 8 Sheets-Sheet 5

INVENTOR.
LEONARD F. CLERC
BY Edward M. Apple
ATTORNEY

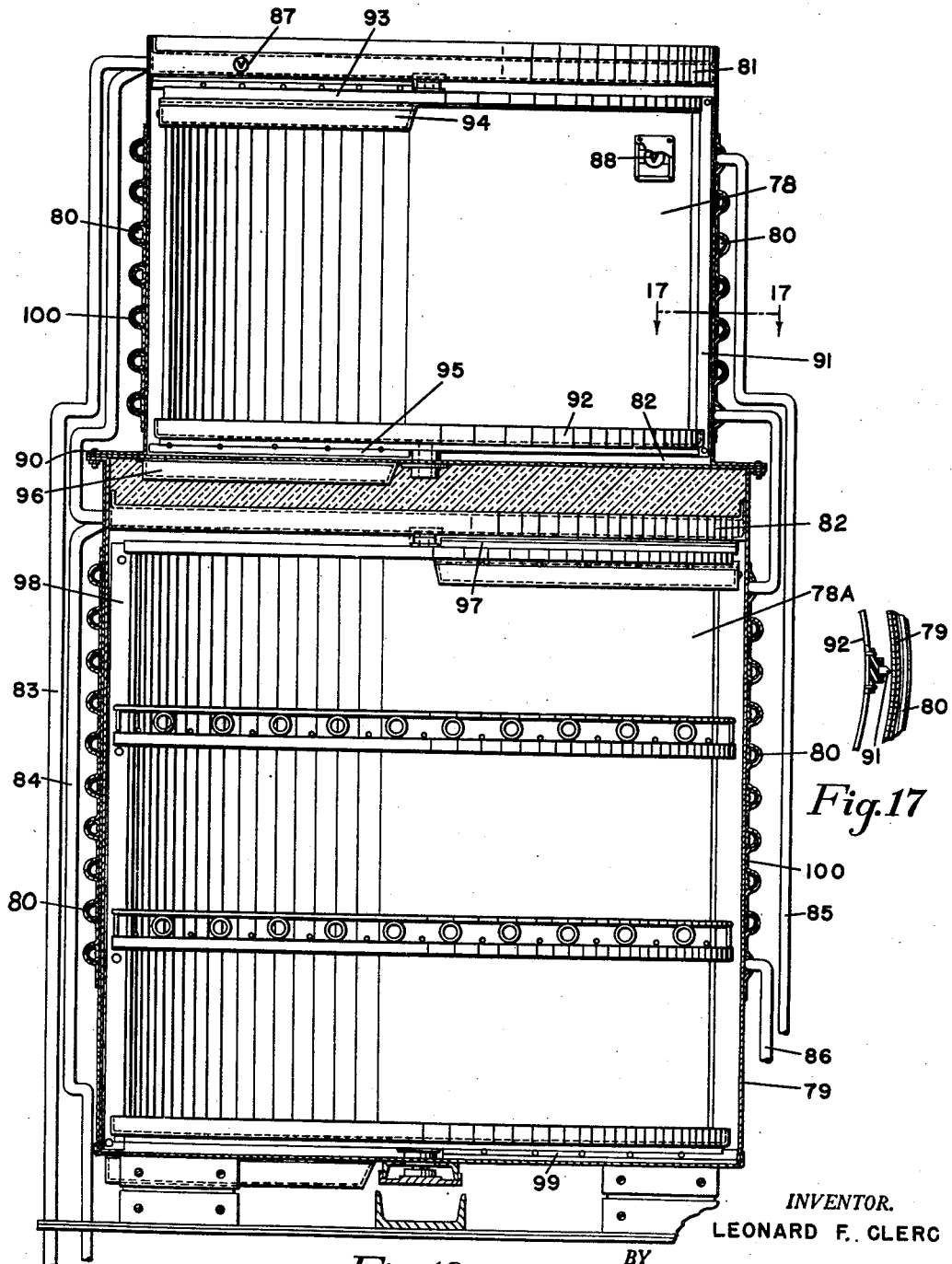

Feb. 21, 1950 L. F. CLERC 2,498,028
REFRIGERATOR
Filed Oct. 15, 1945 8 Sheets-Sheet 7

INVENTOR.
LEONARD F. CLERC

BY Edward M. Apple
ATTORNEY

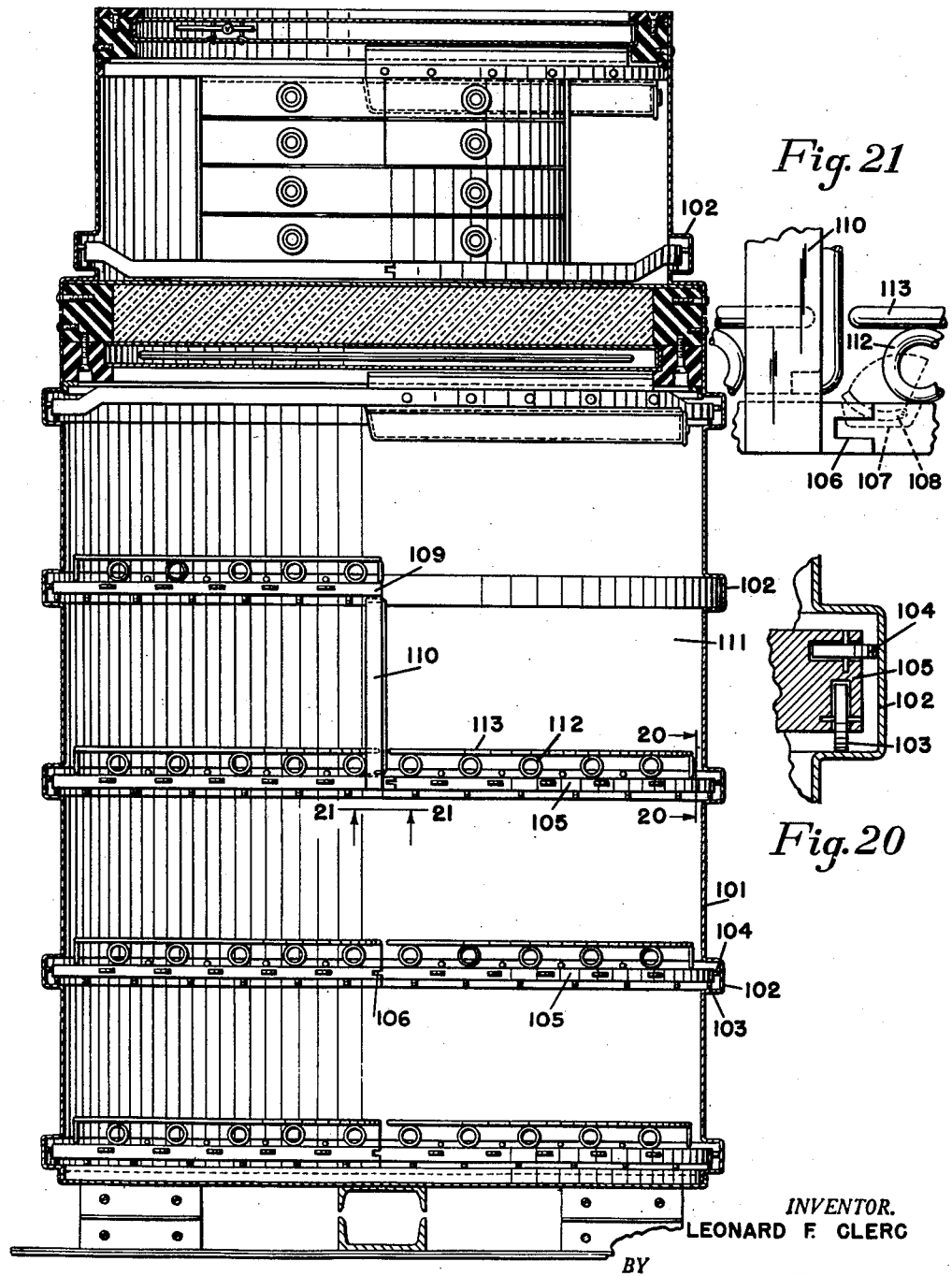

Patented Feb. 21, 1950

2,498,028

UNITED STATES PATENT OFFICE 2,498,028

REFRIGERATOR

Leonard F. Clerc, Nutley, N. J.

Application October 15, 1945, Serial No. 622,272

12 Claims. (Cl. 62—89)

This invention relates to refrigerating devices, and has particular reference to refrigerators for domestic use.

An object of the invention is the provision of a refrigerator which has two compartments, each of which has a different refrigerating capacity.

Another object of the invention is the provision of a domestic refrigerator which has a compartment for quick freezing and a compartment for the storage of perishable foods.

Another object of the invention is the provision of a device of the character indicated, which has compartments of different refrigerating capacity, each of which has rotatable commodity supporting elements, whereby the contents of the compartments are made readily accessible at all times.

Another object of the invention is the provision of a domestic refrigerator which is constructed and arranged in such manner that the shelves are readily removable in sections.

Another object of the invention is the provision of a domestic refrigerator having means for automatically defrosting the interior surfaces and means for disposing of the accumulated frost.

Another object of the invention is the provision of a device of the character indicated, which is constructed and arranged in such manner that it may be defrosted without stopping the refrigerating operation and without changing the temperatures of the interiors of the compartments.

Another object of the invention is the provision of a domestic refrigerator which is constructed and arranged in such manner that the temperature in one compartment may be held at from zero degrees to forty-five degrees below zero, and the temperature in the other compartment may be held between zero degrees and thirty-eight degrees above zero.

Another object of the invention is the provision of a domestic refrigerator, being constructed and arranged in such manner that a great range of temperatures may be obtained in either of the compartments.

Another object of the invention is the provision of a domestic refrigerator having a quick freeze compartment and a perishable food compartment, and having a unitary door frame of low heat conductivity, secured in such manner as to eliminate exposing any metallic surface on the exterior of the door frame.

Another object of the invention is the provision of a domestic refrigerator having two compartments of greatly varying refrigerating capacity and having a unitary low heat conductivity door frame supporting a door for each compartment, each door having a double sealing construction.

Another object of the invention is the provision of a domestic refrigerator having a removable ice tray rack adapted to prevent the ice cube trays from freezing thereto except at widely dispersed contacting points, whereby the trays may be readily removed under all conditions.

Another object of the invention is the provision of a domestic refrigerator constructed and arranged in such manner that the compressor and the motor of the refrigeration machine may be readily removed to the exterior of the cabinet for oiling, overhauling, the like.

Another object of the invention is the provision of a domestic refrigerator being constructed in such manner as to greatly improve the refrigerating capacity over devices of similar size now known to the public.

Another object of the invention is the provision of a domestic refrigerator which is highly efficient in operation, simple in construction, and easy to assemble.

The foregoing and other objects and advantages of the invention will appear as the description proceeds, reference being made from time to time to the accompanying drawings forming part of the within disclosure, in which drawings;

Fig. 1 is a front elevational view, with parts broken away and parts in section, of a device embodying my invention.

Fig. 2 is a fragmentary sectional detail taken substantially on the line 2—2 of Fig. 1.

Fig. 16 is a modified form of structure in which cooling coils are positioned about the outside periphery of the inner shell to provide additional refrigeration, and additional defroster blades are added to remove the frost from all surfaces occasioned by the increased refrigeration.

Fig. 17 is a fragmentary sectional view taken substantially on the line 17—17 of Fig. 16, and showing the relation of one of the vertical defrosting blades with respect to the upper revolving compartment and inner shell of the refrigerator.

Fig. 19 is a modified form of the inner shell of a refrigerator such as shown in Fig. 1 and rotatable commodity supporting members adapted for individual rotation of the several shells.

Fig. 20 is a fragmentary section taken substantially on the line 20—20 of Fig. 19.

Fig. 21 is a fragmentary elevational view taken substantially along the line 21—21 of Fig. 19.

Figure 5:
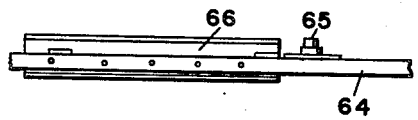
Fig. 5 is an enlarged elevational view taken substantially on the line 5—5 of Fig. 3.

Referring now more particularly to the drawings, it will be understood that in the embodiment herein disclosed, my improved device consists of an outer shell 27, and an inner shell 28, between which is interposed any suitable insulating material 29. The insulating material 29 also extends around the upper and lower compartments as hereinafter described.

The shells 27 and 28 are supported by means of a light steel framework 30 (Figs. 12, 13, and 14), which is secured together by welding or other suitable means. The outer shell 27 is press fitted over the steel framework 30, and the inner shell 28 and the steel framework 30 are secured together as hereinafter described.

In the embodiment disclosed in Fig. 1, the refrigerator is divided into an upper and lower compartment, each of which is adapted to operate under a different temperature, the upper compartment 31 being adapted to have maintained therein a temperature of zero degrees or below, and is intended to serve as a storage space for frozen foods and the like, also for the making and storing of ice cubes, as is hereinafter explained.

The lower compartment 32 is intended to serve as a storage compartment for food, vegetables, and the like, under temperatures ranging from approximately 34 to 40 degrees above zero.

The temperatures in the compartments 31 and 32 are maintained by means of refrigerating cold plates 33 and 34 of conventional design, which cold plates are connected by suitable leads 35 to a refrigerating machine 36, which is installed, as hereinafter described, in the sub-compartment 37 positioned below the food compartment 32.

The refrigerating machine 36 is preferably mounted on spring-like channel members 36A, which are adapted to slide on suitable tracts 36B, whereby the refrigerating machine 36 may be drawn from the compartment 37 by opening the door 36C.

Figure 10:
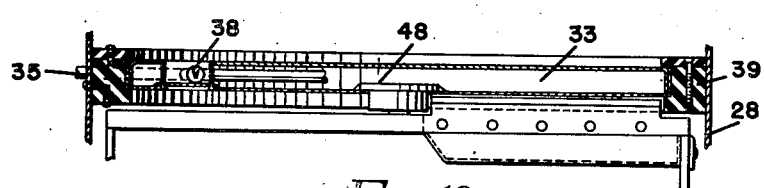
Fig. 10 is a vertical section taken substantially on the line 10—10 of Fig. 1.
Figure 11:
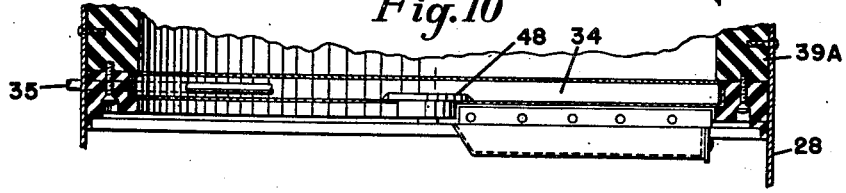
Fig. 11 is a vertical section taken substantially on the line 11—11 of Fig. 1.
Figure 15:
Fig. 15 is a sectional detail taken substantially on the line 15—15 of Fig. 14.

The cold plates 33 and 34 are mounted in rings of rubber 39 and 39A, (Figs. 1, 10, and 11), or other material of low heat conductivity, so that there is a minimum of heat exchange between the cold plates 33 and 34, and the inner metallic shell 28.

The flow of the refrigerant into the cold plate 33 is controlled by means of the expansion valve 38.

Figure 6:
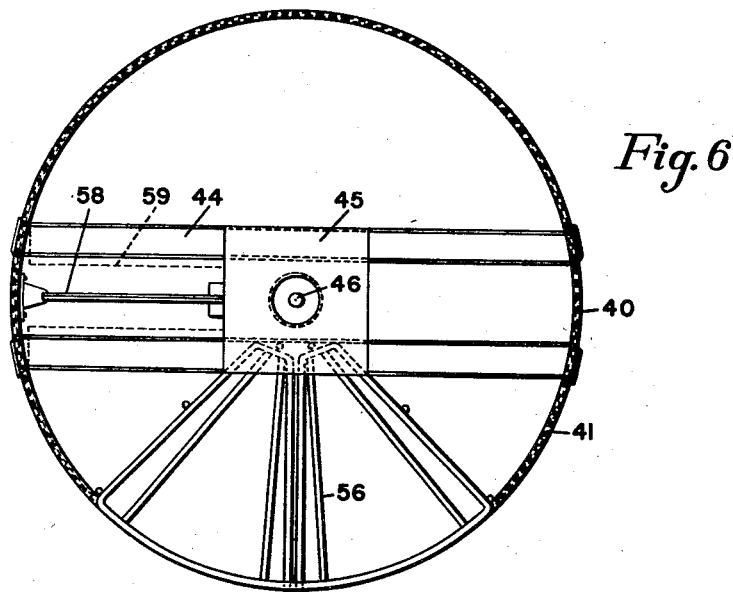
Fig. 6 is a top plan view of the upper revolving commodity supporting member, with defrosting blade attached, and the removable ice tray rack in position.
Figure 7:
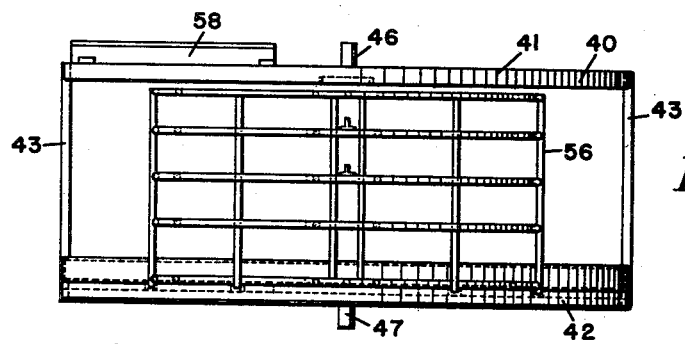
Fig. 7 is a side elevational view of the members shown in Fig. 6.

Mounted for rotation in the upper compartment 31 is a commodity supporting member 40 (Figs. 1, 6, and 7). The member 40 (Fig. 7) consists of a ring 41 and a plate 42 which are secured together by means of vertical supports 43. Extending from one side of the ring 41 to the other (Fig. 6) is a pair of metal straps 44, which are adapted to support the centrally disposed plate 45, to which is secured a pivot 46.

Another pivot 47 is positioned in the center of the plate 42. The pivots 46 and 47 are adapted to engage suitable bearings 48 and 49, which are respectively supported by the cold plate 33 and a steel plate 50 (Fig. 1), comprising the bottom of the upper compartment 31, and which is supported by the rubber ring 39A. The rubber ring 39A is in turn supported by an angle member 51 mounted on the inside of the inner shell 28.

Figure 12:
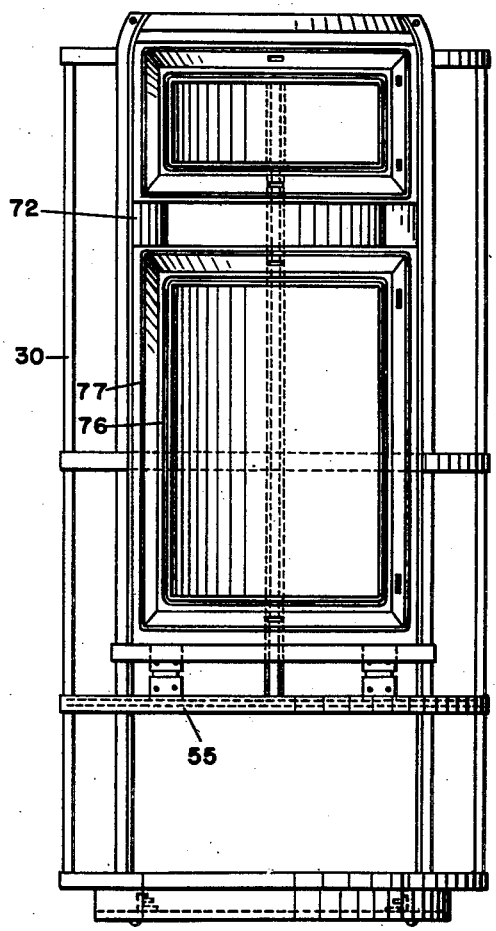
Fig. 12 is a front elevational view of the double door frame assembly attached to the refrigerator supporting framework and inner shell.
Figure 13:
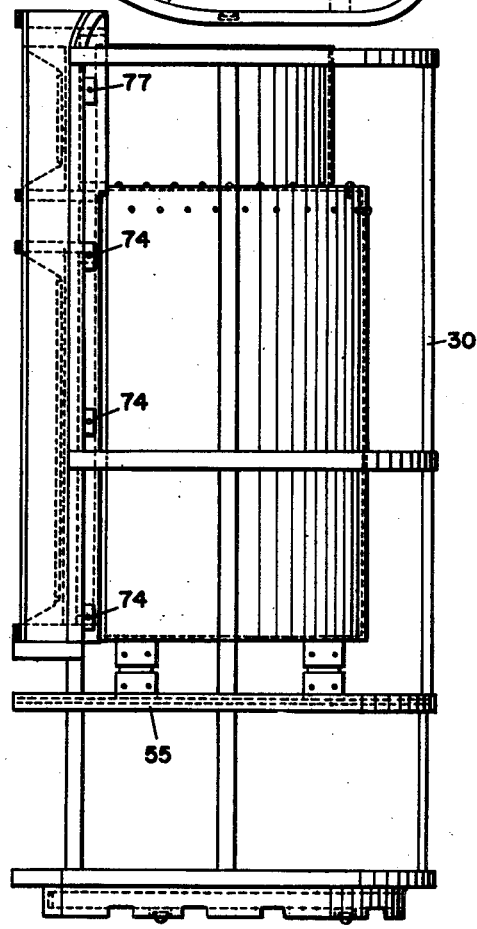
Fig. 13 is a side elevational view of the elements shown in Fig. 12.

It will be noted also that the inner shell 28 is broken as at 52 so that there will be no heat exchange between the upper and lower portions of the inner shell 28. The inner shell 28 is supported at the bottom by means of a bottom closure member 28A, which is supported by means of non-heat conductive blocks of any suitable material 53, which are in turn supported by a plate 54 mounted on top of a cross member 55, comprising part of the steel framework 30 (Figs. 1, 12, and 13).

Figure 8:
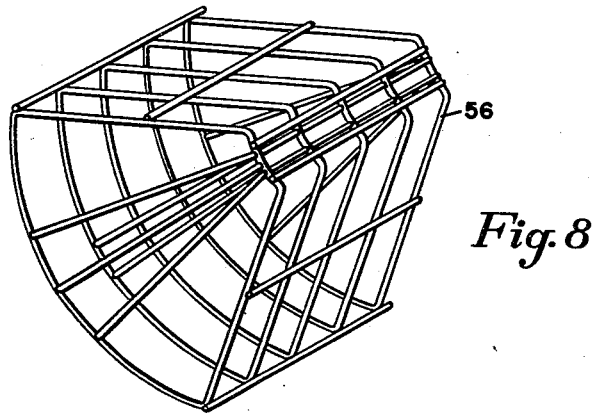
Fig. 8 is a perspective view of the ice tray rack shown in Figs. 6 and 7.
Figure 9:
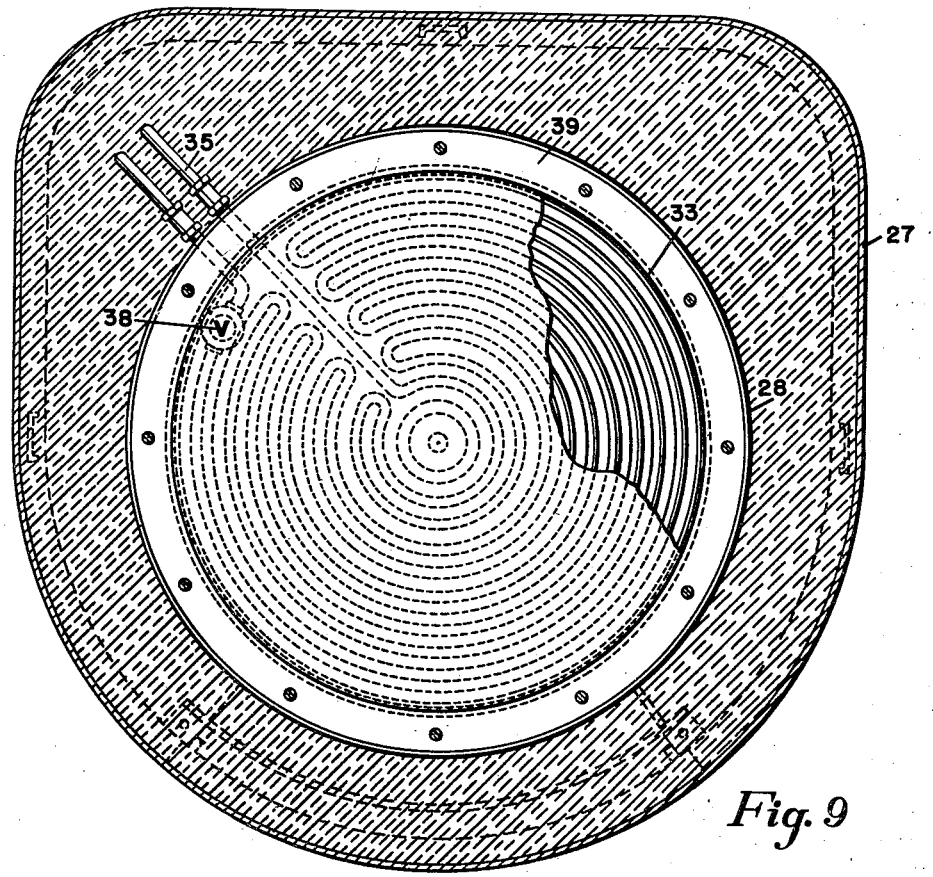
Fig. 9 is a horizontal section taken substantially on the line 9—9 of Fig. 1.

In order to provide ice tray supporting means in the revolving member 40, I provide a removable wire rack 56 (Fig. 8), which is adapted to be inserted between the ring 41 and the plate 42 (Figs. 6 and 7). The wire rack 56 is designed so that a multiplicity of ice trays 57 may be stacked therein as shown in Fig. 1.

In order to defrost the under side of the cold plate 33, I provide a defroster blade 58 (Figs. 1, 6, and 7), which is in constant contact with the under side of the cold plate 33, and removes the frost which accumulates thereon as the member 40 is rotated.

The frost which is scraped from the under side of the plate 33 is deposited in a removable tray 59 (Figs. 1 and 6), which is supported on suitable tracts mounted on the under side of the members 44 (Fig. 6).

The upper compartment 31 is closed by a door 60.

Figure 3:
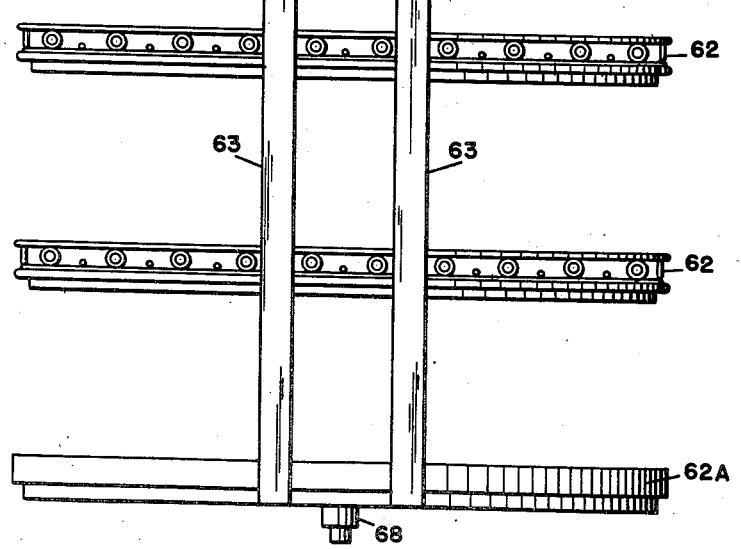
Fig. 3 is an enlarged elevational view of the lower rotatable commodity supporting member, with a defroster blade attached thereto.

Mounted for rotation in the food compartment 32 is a commodity supporting member 61 (Fig. 3). The member 61 consists of a plurality of wire shelves 62 and a solid shelf 62A, which are tied together by vertical members 63.

Cross members 64 (Fig. 4) connect the vertical members 63, and serve as supports for the pivot 65, wiper blade 66, and removable frost receptacle 67, all of which function in the manner hereinabove set out in the description of the defroster blade 58 and the removable tray 59.

The second pivot 68 is mounted in the center of the lower shelf 62A. The pivots 65 and 68 are adapted to engage suitable bearing members 69 and 70, which are respectively carried by the cold plate 34 and the closure member 28A of the inner shell 28 hereinabove referred to.

Figure 4:
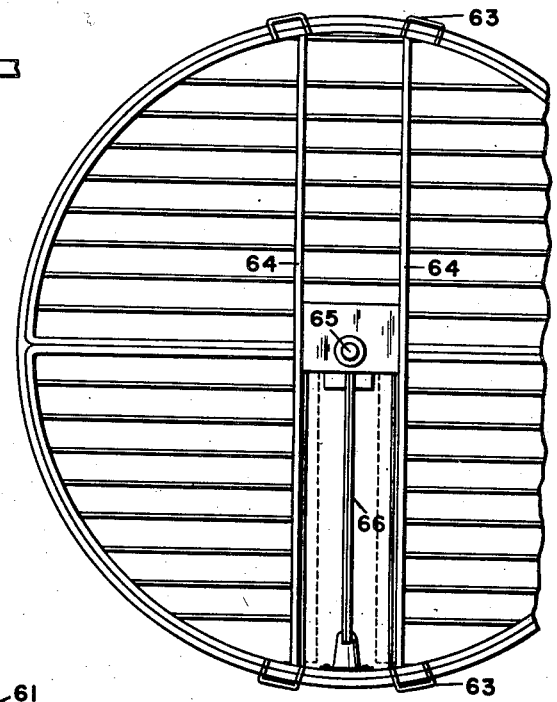
Fig. 4 is a top plan view of the member illustrated in Fig. 3.

The wire shelves 62 are preferably made in halves as shown in Fig. 4 in order that they may readily be removed.

The lower compartment 32 is closed by means of a door 71. The doors 60 and 71 are preferably molded, and have a cross section substantially as shown in Fig. 2, and are provided with insulation 29A and rubber seals 71A and 71B.

Figure 14:
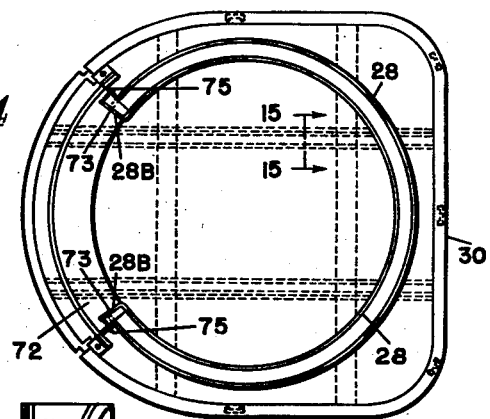
Fig. 14 is a top plan view of the elements in Fig. 12.

I provide an integral frame for both the doors 60 and 71 (Figs. 12, 13, and 14). The door frame 72 is preferably molded of a low heat conductive material, and is provided with longitudinal slots 73 (Fig. 14), which are adapted to engage the flanges 28B formed on the inner shell 28. The door frame 72 is slid into position from the top prior to the installation of the shell 27 and the cabinet top 27A, and is secured to the steel framework 30 as at 74 by screws or other suitable means, and to the inner shell 28 by means of screws 75.

The door frame 72 is provided with suitable grooves 76 and 77, which are adapted to engage the rubber seals 71A and 71B.

In Fig. 16, I have shown a modified form of upper and lower compartments 78 and 78A enclosed within a modified inner shell 79. In this modification, I provide refrigeration coils 80 which are adapted to extend around the sides and back of the inner shell 79 to provide refrigeration capacity in addition to that obtained from the cold plates 81 and 82.

With this modified form of construction, I am able to obtain a variety of temperature ranges in the two compartments. For example, I may cut out the flow of the refrigerant to the coils 80 and depend upon the refrigerating capacity of the cold plates 81 and 82, or I may utilize the combined refrigerating capacity of both the cold plates 81 and 82 and the coils 80.

With this arrangement, I may utilize the upper compartment 78 as a quick freezing compartment with a temperature of approximately 45 degrees below zero, and utilize the lower compartment 78A as a frozen food storage compartment with a temperature of approximately zero; or I may use the upper compartment as a frozen food storage compartment, utilizing a temperature of approximately zero degrees, and the lower compartment as a domestic refrigerator, utilizing temperatures in the neighborhood of 36 to 40 degrees above zero; so that it will be seen that with one refrigerator I am able to do the work which normally would take four boxes to do.

In the embodiment disclosed in Fig. 16, the refrigerant is piped to and from the cold plates 81 and 82 by means of the pipes 83 and 84, and to and from the coils 80 by the pipes 85 and 86.

Figure 18:
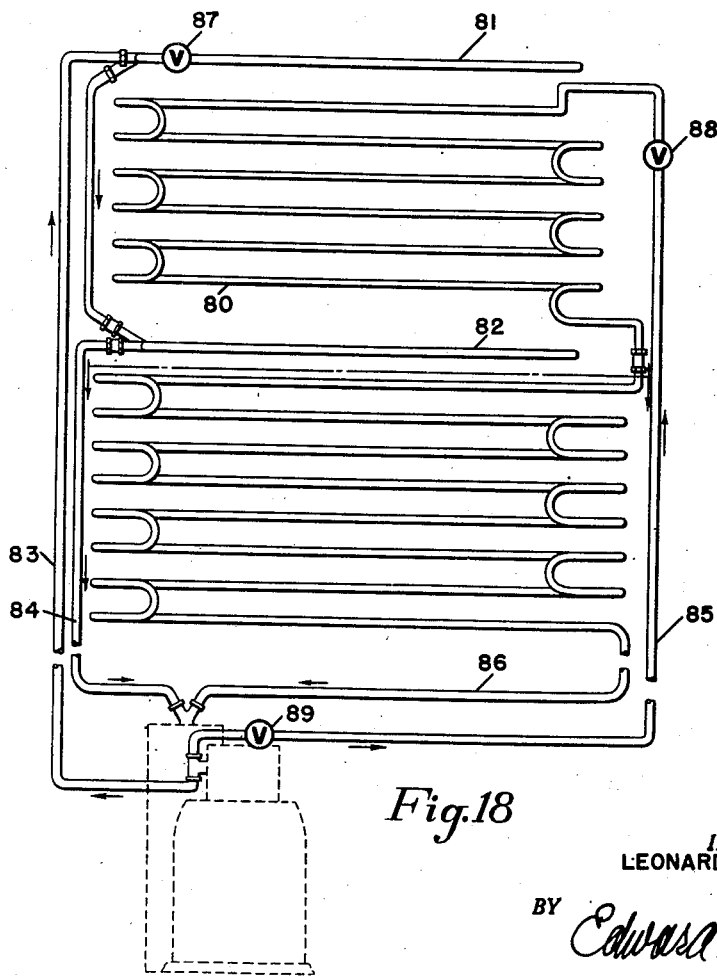
Fig. 18 is a schematic view of the cold plates and coils and other elements comprising the refrigerating system used in the modified form shown in Fig. 16.

The flow of the refrigerant is controlled by the expansion valves 87 and 88, and the valve 89 (Fig. 18), by which the flow of the refrigerant may be reversed. The expansion valves 87 and 88 are positioned so that they are readily accessible from the interior of the upper compartment 78.

In the embodiment shown in Fig. 16, the upper and lower sections of the inner shell may be secured to one another as at 90, and in this embodiment, it is necessary that I be able to defrost the entire interior surface of the inner shell 79. This is accomplished by means of a side defrosting blade 91, which is secured at top and bottom to the revolving member 92. The top of the upper compartment in this embodiment is defrosted by means of the wiper blade 93, which scrapes the frost into the receptacle 94 in the manner hereinbefore described.

The frost which is scraped from the side walls of the upper compartment falls to the bottom compartment, and is picked up by a defroster blade 95 which is positioned on the bottom of the member 92, and which carries the frost into a removable tray 96. The top of the lower compartment 78A is similarly defrosted by means of the defroster blade 97, and the side is defrosted by means of the blade 98, and the bottom is defrosted by means of the blade 99, all of which function as hereinbefore described.

The coils 80 are preferably flattened on the inside as shown in Fig. 16, and are secured in position on the outside of the inner shell 79 by means of a corrugated member 100, which is spot welded to the inner shell 79 at various places not shown.

In Figs. 19, 20, and 21, I illustrate a further modified form of a device in which I provide means for rotating the individual shelves in the lower compartment and rotating the member in the upper compartment without the use of pivots. In this embodiment, the inner shell 101 is provided with grooves 102 which serve as tracts for the rollers 103 and 104, which are mounted on the shelves 105.

Each shelf 105 is formed in two parts, the parts being tongued and grooved as at 106 so that they may be removed in halves from the inner shell 101. In order to prevent the halves comprising the shelf from being displaced from one another, I provide a groove 107 and a locking detent 108, which is pivoted at the end so that it may be dropped in the groove or removed therefrom.

The top shelf 109 is made in the form of a half circle, and is supported by the shelf immediately below by means of supporting members 110. This permits tall bottles and the like to be carried on the shelf 105 in the space 111.

Each of the shelves in this embodiment is preferably provided with a side rail consisting of a plurality of wire rings 112, and a top wire rail 113, all of which are secured together and to their shelves by spot welding or other suitable means.

The modification illustrated in Fig. 19 is otherwise constructed and functions as hereinbefore described.

Having described my invention, what I claim and desire to secure by Letters Patent is:

1. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, there being means carried by said rotatable members for defrosting the walls of said compartments.

2. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, there being a framework for supporting said shells, a unitary door frame for said compartments, means to attach said unitary door frame to said framework, and means to attach said door frame to said inner shell.

3. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, there being a framework for supporting said shells, a unitary door frame for said compartments, means to attach said unitary door frame to said framework, and means to attach said door frame to said inner shell, said last named means including longitudinal grooves in said door frame adapted to engage flanges formed on said inner shell.

4. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, a unitary door frame and separate doors for said compartments, and a pair of spaced grooves for each door opening in said door frame adapted to engage sealing elements carried by each of said doors.

5. In a device of the character described, including outer and inner shells encompassing two refrigerating compartments, the combination of cold plates above and below one of said compartments, coils on the exterior of said inner shell, means to secure said coils in close relation to said inner shell, means to control the flow of refrigerant through said cold plates and said coils, rotatable commodity supporting members in each of said compartments, and means carried by said rotatable members for defrosting the interior walls of said inner shell.

6. In a device of the character described, the combination of an outer shell and inner shells encompassing at least two refrigerating compartments of different capacity, rotatable shelves in each of said compartments, and means formed on the inside wall of said inner shell for independently supporting said shelves for rotation, a cold plate in each compartment having passageways therein connected to a refrigerant circuit, and means on said rotatable shelves for wiping said plates.

7. The combination defined in claim 6, in which at least one of said rotatable shelves in each compartment is provided with a blade for defrosting the inside walls of said inner shell.

8. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, and means carried by said rotatable members for defrosting the walls of said compartments, and means for collecting and removing the frost removed from the walls of said compartments.

9. In a device of the character described, including an outer shell and inner shells encompassing insulated upper and lower refrigerating compartments of different capacities, the combination of rotatable commodity supporting elements in each compartment, each of said elements being formed with substantial portions of open work adapted to permit the circulation of air in and about the elements, and means carried on certain of the elements for defrosting the walls of the inner shells.

10. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, and valve means accessible from the interior of said compartments for controlling the refrigerating means of said compartments.

11. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, the said rotatable commodity supporting members being constructed and arranged as shelves, each of said shelves being divided into two halves, each of said halves being independently removable.

12. In a device of the character described, including an outer shell, inner shells and insulated upper and lower compartments, each having a rotatable commodity supporting member therein, the combination of means for independently refrigerating said compartments, said means comprising a cold plate for each said compartment, and defining one wall thereof, said plates having passageways therein communicating with a refrigerating machine, the said rotatable commodity supporting members being constructed and arranged as shelves, each of said shelves being divided into two halves, each of said halves being independently removable, and means for interlocking the two halves of each respective shelf.

LEONARD F. CLERC.

REFERENCES CITED

The following references are of record in the file of this patent:

UNITED STATES PATENTS

| Number | Name | Date |
| --- | --- | --- |
| 1,095,008 | Mackin | Apr. 28, 1914 |
| 2,347,985 | Beersman | May 2, 1944 |
| 2,400,135 | Quinn | May 14, 1946 |